United States Patent
Lee et al.

(10) Patent No.: US 9,323,110 B2
(45) Date of Patent: Apr. 26, 2016

(54) DISPLAY COMPONENT HAVING INJECTION HOLES ON PERPENDICULAR SURFACES

(71) Applicant: Samsung Display Co., Ltd., Yongin, Gyeonggi-Do (KR)

(72) Inventors: Seon Uk Lee, Seongnam-si (KR); Tae Woo Lim, Hwaseong-si (KR); Sun Hwa Lee, Andong-si (KR)

(73) Assignee: Samsung Display Co., Ltd. (KR)

( * ) Notice: Subject to any disclaimer, the term of this patent is extended or adjusted under 35 U.S.C. 154(b) by 209 days.

(21) Appl. No.: 14/142,524

(22) Filed: Dec. 27, 2013

(65) Prior Publication Data

US 2014/0362329 A1    Dec. 11, 2014

(30) Foreign Application Priority Data

Jun. 5, 2013  (KR) .................. 10-2013-0064775

(51) Int. Cl.
  *G02F 1/1333*   (2006.01)
  *G02F 1/1339*   (2006.01)
  *G02F 1/1341*   (2006.01)

(52) U.S. Cl.
  CPC .. *G02F 1/1341* (2013.01); *G02F 2001/133368* (2013.01)

(58) Field of Classification Search
  CPC .............. G02F 1/133345; G02F 1/133377; G02F 1/1362; G02F 2001/133368; G02F 1/1334; G02F 1/1341
  See application file for complete search history.

(56) References Cited

U.S. PATENT DOCUMENTS

| 5,461,003 A * | 10/1995 | Havemann | H01L 21/02126 257/E21.581 |
| 5,986,729 A * | 11/1999 | Yamanaka | G02F 1/1333 349/153 |
| 2003/0038912 A1* | 2/2003 | Broer | C09K 19/00 349/122 |
| 2006/0146267 A1* | 7/2006 | Choi | G02F 1/133377 349/156 |
| 2012/0062448 A1* | 3/2012 | Kim | G02F 1/133377 345/55 |

FOREIGN PATENT DOCUMENTS

KR  10-2012-0026880   3/2012

* cited by examiner

*Primary Examiner* — Paul Lee
(74) *Attorney, Agent, or Firm* — Innovation Counsel LLP

(57) ABSTRACT

A display device configured to control an aggregation position of an alignment layer and a manufacturing method thereof are disclosed. The device includes a substrate including pixel areas; a thin film transistor formed on the substrate; a pixel electrode connected to the thin film transistor and formed on the pixel area; a roof layer formed above the pixel electrode and separated from the pixel electrode by a micro-cavity; a first injection hole formed in the roof layer and extending to a first edge and/or a second edge of the micro-cavity; a second injection hole formed in the roof layer and extending to a left edge and a right edge of the micro-cavity; a liquid crystal layer in the micro-cavity; and an encapsulation layer formed on the roof layer to cover the first injection hole and the second injection hole.

12 Claims, 11 Drawing Sheets

DISPLAY COMPONENT HAVING INJECTION HOLES ON PERPENDICULAR SURFACES

CROSS-REFERENCE TO RELATED APPLICATION

This application claims priority to and the benefit of Korean Patent Application No. 10-2013-0064775 filed in the Korean Intellectual Property Office on Jun. 5, 2013, the entire contents of which are incorporated herein by reference.

BACKGROUND (a) Technical Field

The present invention relates to a display device. More particularly, the present invention relates to a display device capable of controlling an aggregation position of an alignment layer and a manufacturing method thereof.

(b) Description of the Related Art

Liquid crystal displays are one of the flat panel displays that are widely used today. Typically, a liquid crystal display includes two display panels on which electric field generating electrodes, such as a pixel electrode and a common electrode, are formed, and a liquid crystal layer disposed therebetween. The liquid crystal display generates an electric field in the liquid crystal layer by applying a voltage to the electric field generating electrode, determines alignment of liquid crystal molecules of the liquid crystal layer through the generated electric field, and displays an image by controlling polarization of incident light.

Two display panels constituting the liquid crystal display may include a thin film transistor array panel and a cover display panel. A gate line to transmit a gate signal and a data line to transmit a data signal may be alternately formed on the thin film transistor array panel to intersect each other. A thin film transistor connected to the gate line and the data line, a pixel electrode connected to the thin film transistor, and the like, may be formed on the thin film transistor array panel. A light blocking member, a color filter, a common electrode, and the like, may be formed on the cover display panel. In some cases, the light blocking member, the color filter, and the common electrode may also be formed on the thin film transistor array panel.

However, liquid crystal displays have room for improvement; for example, their cost of manufacturing is high and manufacturing process time is long because two substrates are used and constituent elements are formed on each of the two substrates. The display could also benefit from being made lighter, as they are often used in portable devices for end users.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a display device that may reduce weight, thickness, costs, and process time by manufacturing a display device using a single substrate, and a manufacturing method thereof.

Also, the present invention provides a display device that may control an aggregation position of an alignment layer and a manufacturing method thereof.

An exemplary embodiment of the present invention provides a display device including: a substrate including a plurality of pixel areas; a thin film transistor formed on the substrate; a pixel electrode connected to the thin film transistor and formed on the pixel area; a roof layer formed above the pixel electrode and separated from the pixel electrode by a micro-cavity disposed between the pixel electrode and the roof layer; a first injection hole formed on the first surface of the roof layer and extending to at least a portion of a first edge and a second edge of the micro-cavity; a second injection hole formed in the roof layer and extending to at least a portion of a left edge and a right edge of the micro-cavity; a liquid crystal layer in the micro-cavity; and an encapsulation layer formed on the roof layer covering the first injection hole and the second injection hole and sealing the micro-cavity.

The second injection hole positioned at the left edge of the micro-cavity may differ from the second injection hole positioned at the right edge of the micro-cavity in terms of at least one of shape, size, and number.

The micro-cavity may be one of a plurality of micro-cavities disposed in a matrix configuration including a plurality of rows and a plurality of columns. The display device may further include a first valley disposed between the micro-cavities positioned in different rows; and a second valley disposed between the micro-cavities positioned in different columns.

The first injection hole may be formed on the first valley, and the second injection hole may be formed on the second valley.

The roof layer may include an upper portion configured to cover the micro-cavity; and a sidewall portion configured to cover a left or right edge of the micro-cavity.

The upper portion may be formed on the pixel area, and the sidewall portion may be formed on the second valley.

The display device may further include a support pillar extending from the roof layer to cover at least a portion of the first edge or the second edge of the micro-cavity.

The support pillar may reduce the size of the first injection hole.

The second injection hole may be formed to be positioned on at least one second valley next to the micro-cavity.

In another aspect, the invention pertains to a roof layer for holding liquid crystal molecules in a display device, the roof layer including a plurality of micro-cavities for holding the liquid crystal molecules. The roof layer has at least one first injection hole formed on a sidewall portion and at least one second injection hole formed on an upper portion that is substantially perpendicular to the sidewall portion. The first and second injection holes extend to the micro-cavities.

The aforementioned display device and manufacturing method thereof according to an exemplary embodiment of the present invention have the following effects.

A display device and a manufacturing method thereof according to exemplary embodiments of the present invention may reduce a weight, a thickness, costs, and a process time by manufacturing the display device using a single substrate.

Also, it is possible to control an aggregation position of an alignment layer by asymmetrically forming second injection holes on a left edge and a right edge of a micro-cavity.

DETAILED DESCRIPTION OF THE EMBODIMENTS

Figure 1:
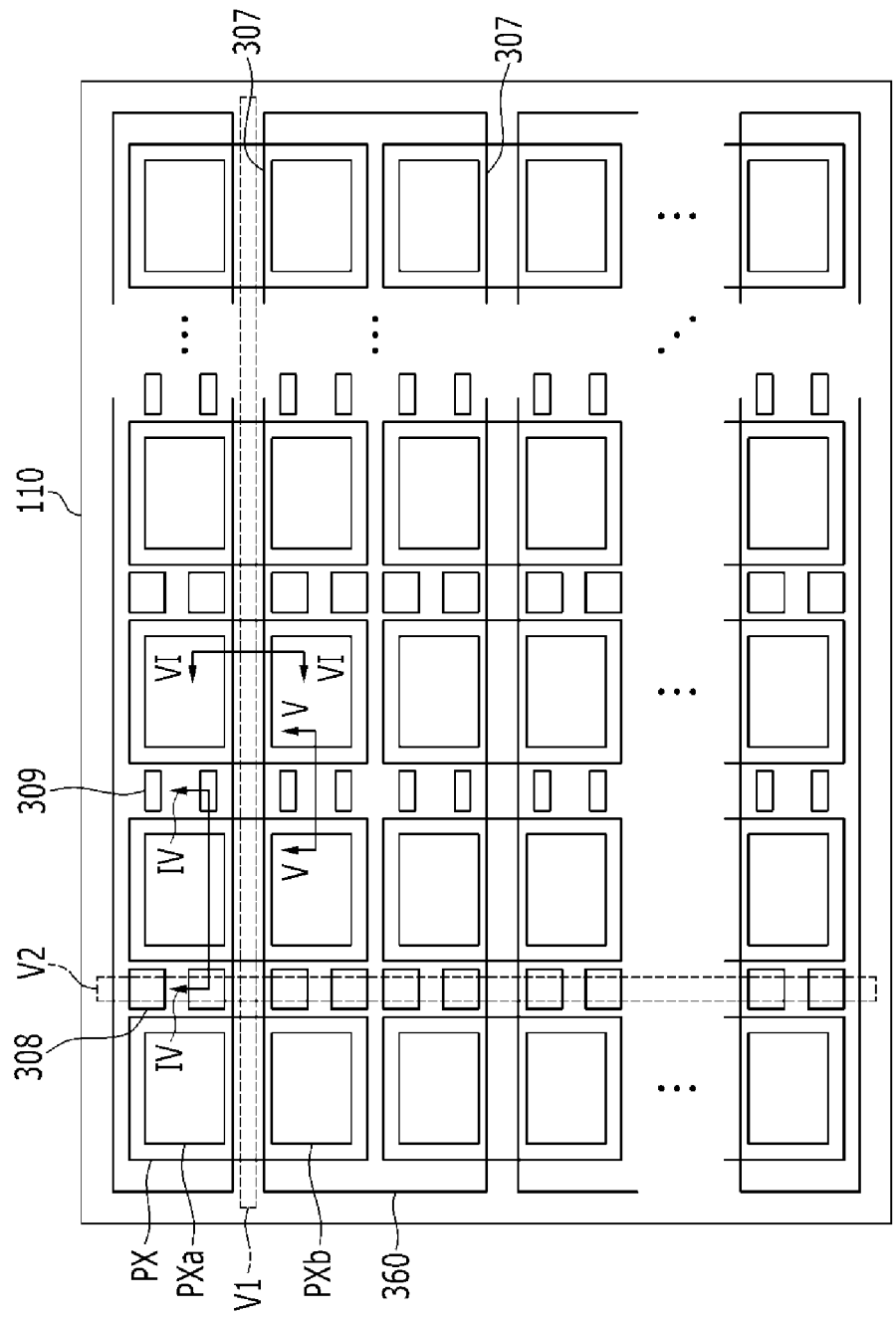
FIGS. 1 and 2 are top plan views illustrating a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Initially, a display device according to an exemplary embodiment of the present invention will be schematically described with reference to the accompanying drawings.

Figure 2:
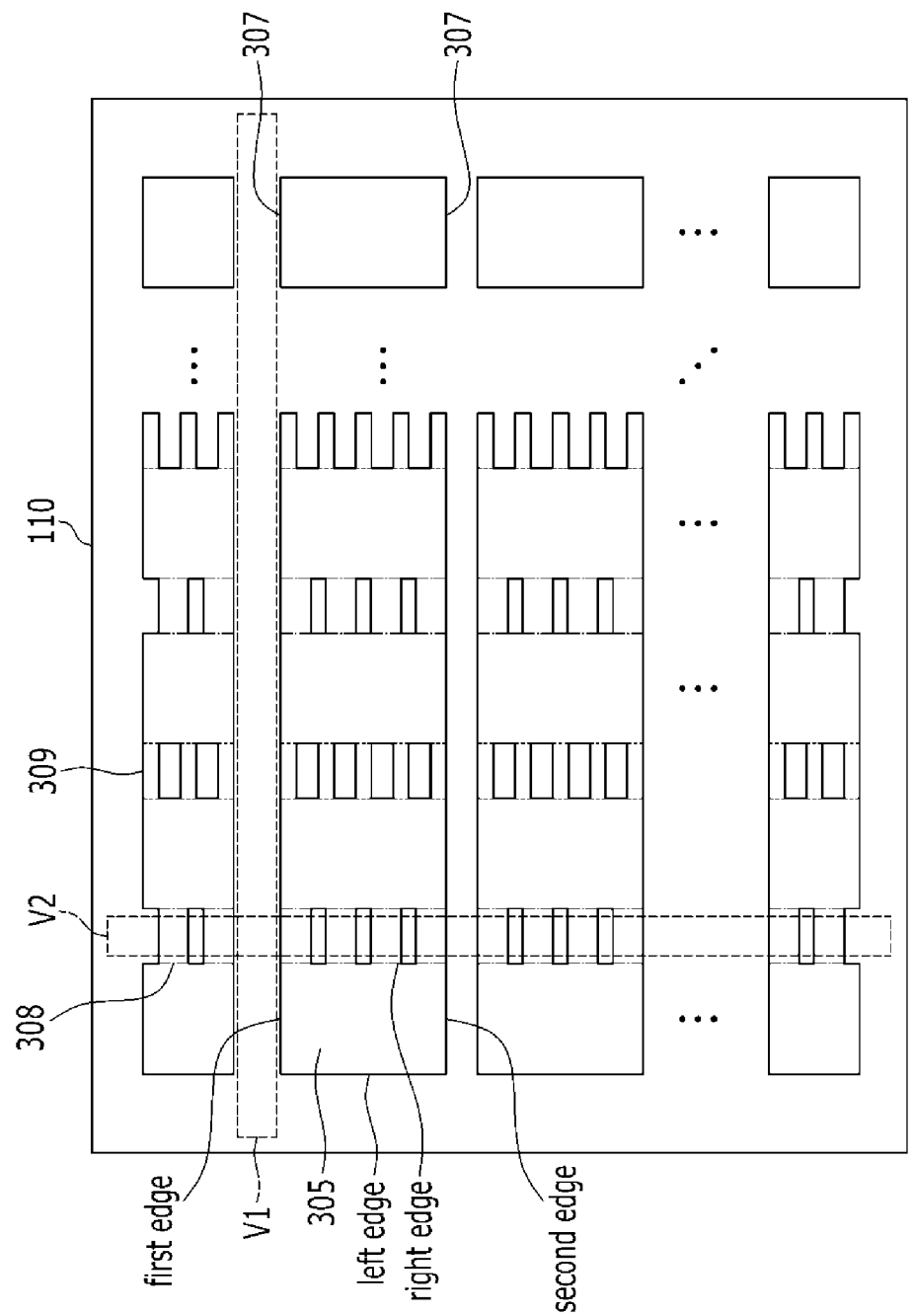
Figure 3:
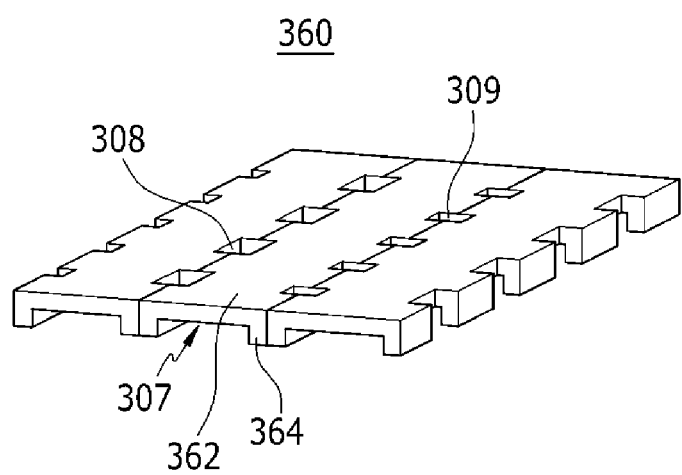
FIG. 3 is a perspective view illustrating a roof layer of a display device according to an exemplary embodiment of the present invention.

FIGS. 1 and 2 are top plan views illustrating a display device according to an exemplary embodiment of the present invention. For convenience, only a portion of constituent elements are illustrated in FIGS. 1 and 2. FIG. 1 illustrates positions of a first injection hole and a second injection hole based on a plurality of pixel areas, and FIG. 2 illustrates positions of the first injection hole and the second injection hole based on a plurality of micro-cavities. FIG. 3 is a perspective view illustrating a roof layer of a display device according to an exemplary embodiment of the present invention.

A display device according to an exemplary embodiment of the present invention includes a substrate 110 made of a material such as glass or plastic, and a roof layer 360 formed on the substrate 110.

The substrate 110 includes a plurality of pixel areas PX. The plurality of pixel areas PX is disposed in a matrix configuration including a plurality of pixel rows and a plurality of pixel columns. Each pixel area PX may include a first sub-pixel area PXa and a second sub-pixel area PXb. The first sub-pixel area PXa and the second sub-pixel area PXb may be disposed in different rows, although this is not a limitation of the disclosure.

Although not explicitly shown in the figures, there are a plurality of first valleys V1 and second valleys V2. A first valley V1 extends between two rows of sub-pixel areas, and a second valley V2 extends between two columns of pixel areas PX. The first valley V1 may also extend between neighboring pixel areas PX.

The roof layer 360 is formed separately from the substrate 110 and disposed in the plurality of pixel areas PX. A micro-cavity 305 is formed below the roof layer 360. In one embodiment, a plurality of micro-cavities 305 are disposed in a matrix configuration including a plurality of rows and a plurality of columns. The first valley V1 extends between the micro-cavities 305 positioned in different rows, and the second valley V2 is positioned between the micro-cavities 305 positioned in different columns.

The roof layer 360 includes an upper portion 362 configured to cover a top surface of the micro-cavity 305 and a sidewall portion 364 configured to cover a side surface of the micro-cavity 305. The upper portion 362 of the roof layer 360 is formed on the pixel area PX, and the sidewall portion 364 is formed on the second valley V2. The upper portion 362 of the roof layer 360 is formed to be separate from the substrate 110 and connected to the substrate 110 by the sidewall portion 364. Accordingly, a single micro-cavity 305 is covered by the roof layer 360 that extends over the first sub-pixel area PXa and the second sub-pixel area PXb. For example, a single micro-cavity 305 is formed over the second sub-pixel area PXb of a first pixel row and the first sub-pixel area PXa of a second pixel row. However, the inventive concept is not limited thereto and a single micro-cavity 305 may also be formed on a single sub-pixel area PXa.

A first injection hole 307 is formed in the roof layer 360 to expose at least a portion of a first edge and a second edge of the micro-cavity 305. The first injection hole 307 is formed by removing a portion of the roof layer 360 that is positioned in the first valley V1. At least one first injection hole 307 is formed on a single micro-cavity 305. For example, the first injection hole 307 may be formed on the first edge of the micro-cavity 305, the first injection hole 307 may be formed on the second edge of the micro-cavity 305, and the first injection hole 307 may be formed on both of the first edge and the second edge.

Also, second injection holes 308 and 309 are formed in the roof layer 360 to expose at least a portion of a left edge and a right edge of the micro-cavity 305. The second injection holes 308 and 309 are formed by removing at least a portion of the roof layer 360 positioned in the second valley V2. At least one second injection hole, for example, the second injection holes 308 and 309 are formed next to a micro-cavity 305, sometimes between neighboring micro-cavities 305. For example, the second injection hole 308 may be formed next to the left edge of the micro-cavity 305, and the second injection hole 309 may be formed next to the right edge of the same micro-cavity 305. Here, a plurality of second injection holes 308 may be formed next to the left edge of the micro-cavity 305, and a plurality of second injection holes 309 may be formed next to the right edge of the micro-cavity 305. That is, the roof layer 360 may include a plurality of sidewall portions 364 formed at predetermined intervals, and the second injection holes 308 and 309 may be formed between the plurality of sidewall portions 364. As shown by the open edge of the segment of the roof layer 360 in FIG. 3, the sidewall portion 364 and the second injection hole 308/309 are formed in an alternating manner in the direction in which the second valley V2 extends.

The second injection hole 308 positioned next the left edge of the micro-cavity 305 differs from the second injection hole 309 positioned next the right edge of the micro-cavity 305 in terms of at least one of shape, size, and number.

For example, as illustrated in FIGS. 1 to 3, the second injection hole 308 positioned next to the left edge of the micro-cavity 305 positioned in the second pixel column is larger than the second injection hole 309 positioned next to the right edge of the micro-cavity 305. However, there is a fewer number of the second injection holes 308 than the second injection holes 309 next to a micro-cavity 305. In some embodiments, it is possible to form the second injection hole 309 positioned near the right edge of the micro-cavity 305 to be larger and in fewer number than the second injection hole 308 positioned next to the left edge of the micro-cavity 305. Also, although the second injection holes 308 and 309 positioned between columns of the micro-cavity 305 are shown to be rectangularly shaped, this is not a limitation of the inventive concept and other shapes may be used.

Hereinafter, a display device according to an exemplary embodiment of the inventive disclosure will be further described with reference to FIGS. 1 through 7.

Figure 4:
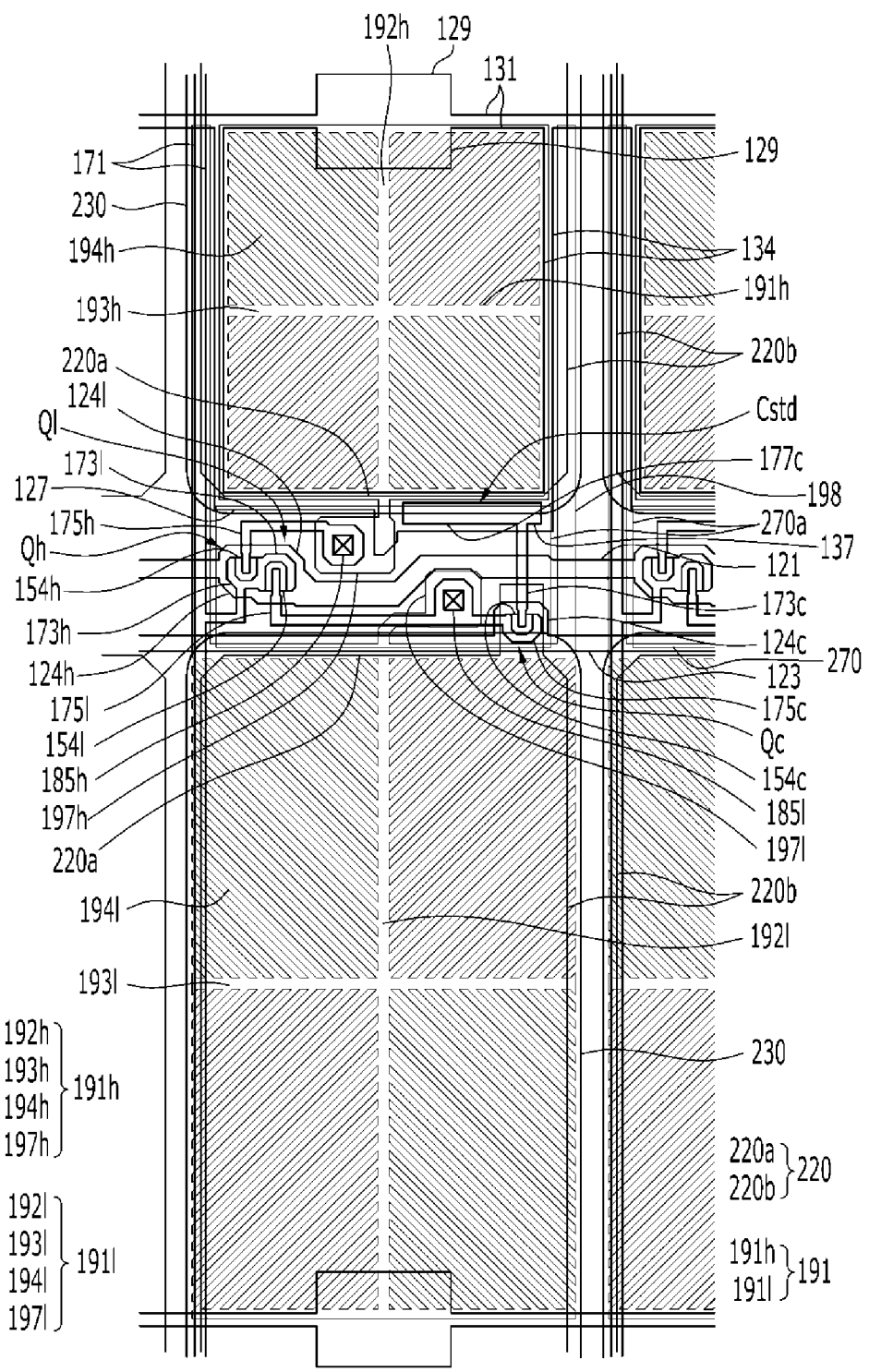
FIG. 4 is a top plan view illustrating a single pixel of a display device according to an exemplary embodiment of the present invention.
Figure 5:
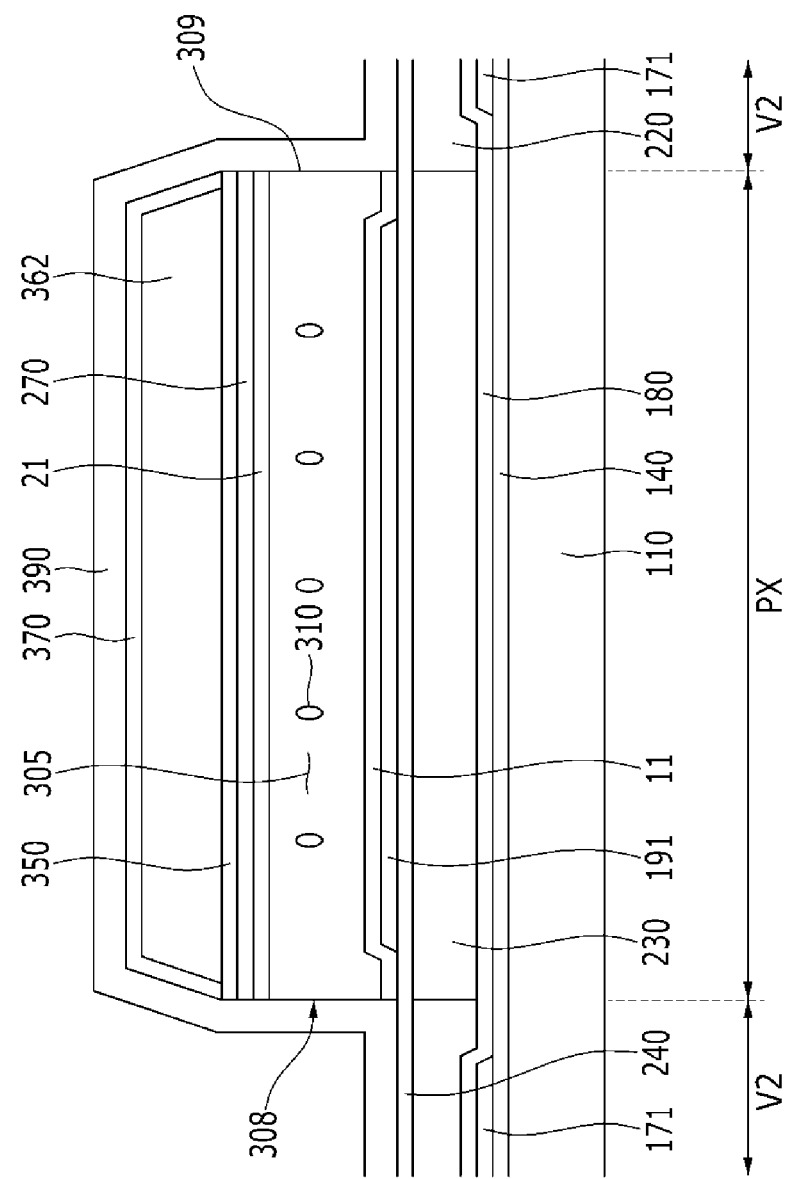
FIG. 5 is a cross-sectional view illustrating a portion of a display device according to an exemplary embodiment of the present invention taken along line V-V of FIG. 1.
Figure 6:
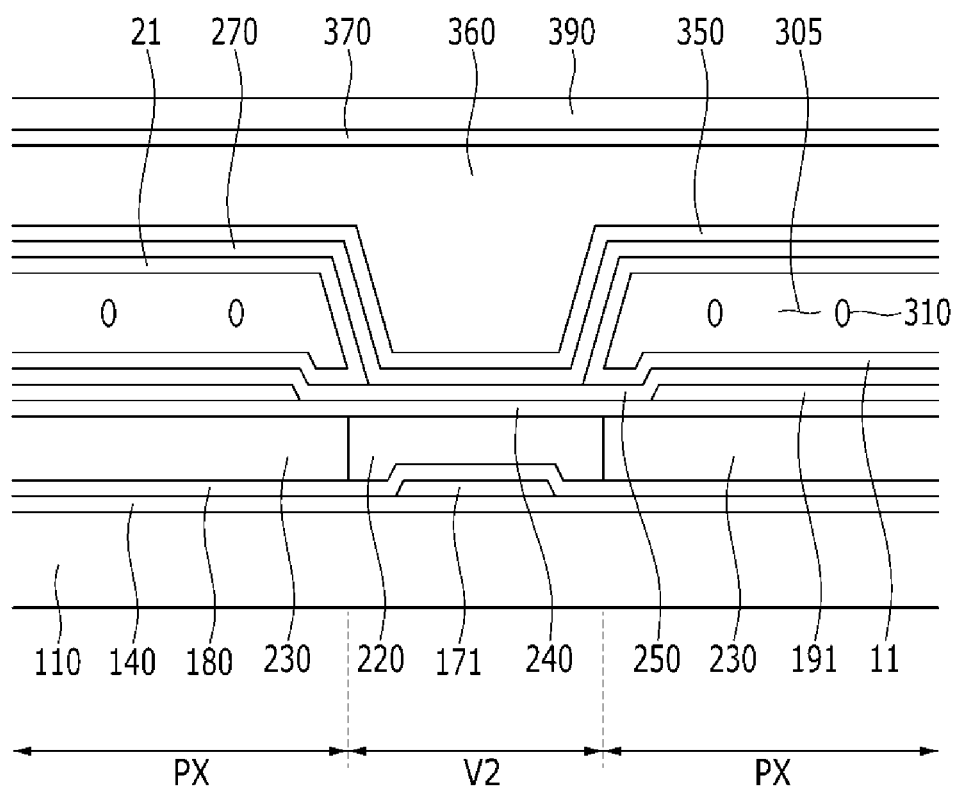
FIG. 6 is a cross-sectional view illustrating a portion of a display device according to an exemplary embodiment of the present invention taken along line VI-VI of FIG. 1.
Figure 7:
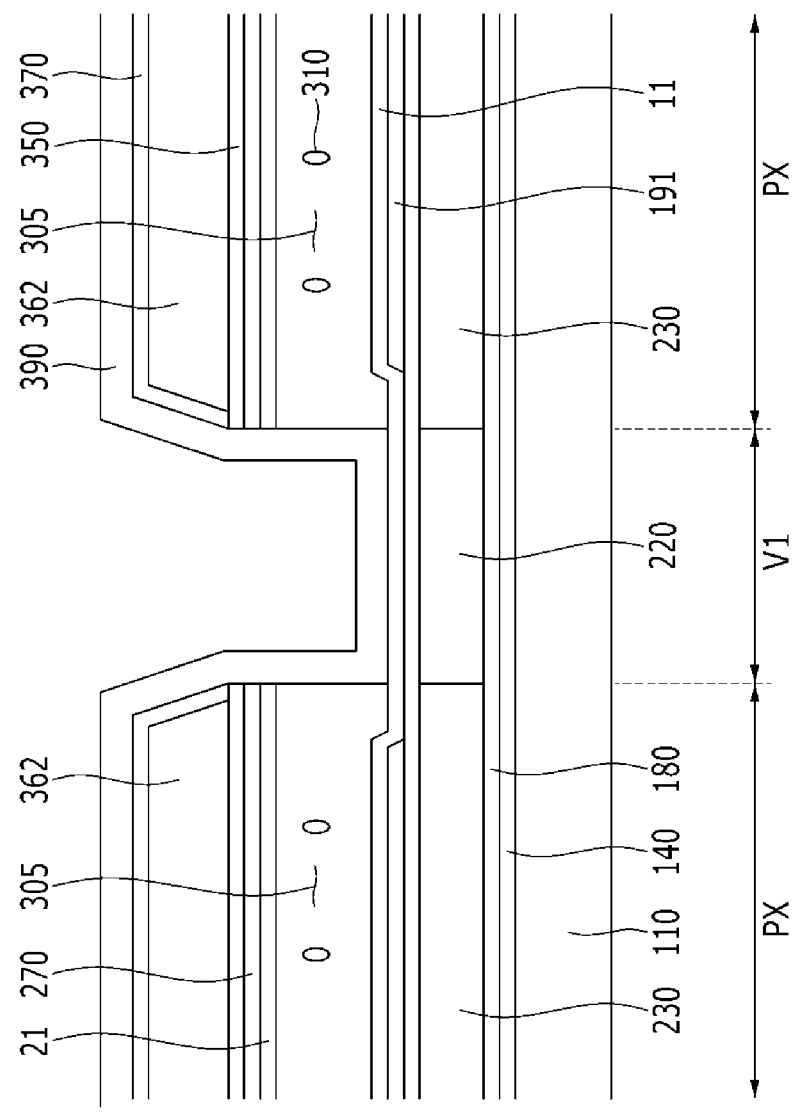
FIG. 7 is a cross-sectional view illustrating a portion of a display device according to an exemplary embodiment of the present invention taken along line VII-VII of FIG. 1.

FIG. 4 is a top plan view illustrating a single pixel of a display device according to an exemplary embodiment of the present invention, FIG. 5 is a cross-sectional view illustrating a portion of a display device according to an exemplary embodiment of the present invention taken along line V-V of FIG. 1, FIG. 6 is a cross-sectional view illustrating a portion of a display device according to an exemplary embodiment of the present invention taken along line VI-VI of FIG. 1, and FIG. 7 is a cross-sectional view illustrating a portion of a display device according to an exemplary embodiment of the present invention taken along line VII-VII of FIG. 1.

Referring to FIGS. 1 to 7, a plurality of gate conductors including a plurality of gate lines 121, a plurality of step-down gate lines 123, and a plurality of storage electrode lines 131 are formed on the substrate 110.

The gate line 121 and the step-down gate line 123 generally extend in a horizontal direction and transfer a gate signal ("horizontal" being with respect to FIG. 4). The gate conductor further includes a first gate electrode 124h and a second gate electrode 124l that protrude upward and downward from the gate line 121 ("upward" and "downward" being with respect to FIG. 4), and a third gate electrode 124c that protrudes upward from the step-down gate line 123. The first gate electrode 124h and the second gate electrode 124l are connected to each other to form what is herein referred to as a single "protruding portion." The particular shapes and positions of the first, the second, and the third gate electrodes 124h, 124l, and 124c that are depicted are not limitations of the inventive concept.

The storage electrode line 131 generally extends in a horizontal direction and transfers predetermined voltage such as common voltage Vcom. The storage electrode line 131 includes a storage electrode 129 that protrudes upward and downward from the storage electrode line 131, a pair of vertical portions 134 that extends downward to be substantially vertical to the gate line 131, and a horizontal portion 127 that connects ends of a pair of vertical portions 134 to each other. The horizontal portion 127 includes a capacity electrode 137 that extends downward.

A gate insulating layer 140 is formed on the gate conductors 121, 123, 124h, 124l, 124c, and 131. The gate insulating layer 140 may be made of an inorganic insulating material such as silicon nitride (SiNx), silicon oxide (SiOx), and the like.

Also, the gate insulating layer 140 may include a single layer or multiple layers.

A first semiconductor 154h, a second semiconductor 154l, and a third semiconductor 154c are formed on the gate insulating layer 140. The first semiconductor 154h may be disposed on the first gate electrode 124h, the second semiconductor 154l may be disposed on the second gate electrode 124l, and the third semiconductor 154c may be disposed on the third gate electrode 124c. The first semiconductor 154h and the second semiconductor 154l may be connected to each other, and the second semiconductor 154l and the third semiconductor 154c may be connected to each other. Also, the first semiconductor 154h may be extended up to below a data line 171. The first to the third semiconductors 154h, 154l, and 154c may be made of amorphous silicon, polycrystalline silicon, metal oxide, and the like.

An ohmic contact (not shown) may be further formed on each of the first to the third semiconductors 154h, 154l, and 154c. The ohmic contact may be made of a material such as silicide or n+ hydrogenated amorphous silicon in which n-type impurity is doped at a high concentration.

A data conductor including the data line 171, a first source electrode 173h, a second source electrode 173l, a third source electrode 173c, a first drain electrode 175h, a second drain electrode 175l, and a third drain electrode 175c is formed on the first to the third semiconductors 154h, 154l, and 154c.

The data line 171 transfers a data signal, and generally extends in a vertical direction to intersect the gate line 121 and the step-down gate line 123. Each data line 171 includes the first source electrode 173h and the second source electrode 173l that extend toward the first gate electrode 124h and the second gate electrode 124l and are connected to each other.

Each of the first drain electrode 175h, the second drain electrode 175l, and the third drain electrode 175c includes one wide end portion and the other bar-shaped end portion. Bar-shaped end portions of the first drain electrode 175h and the second drain electrode 175l are partially surrounded by the first source electrode 173h and the second source electrode 173l. The wide end of the second drain electrode 175l extends to thereby constitute the third source electrode 173c that is bent in a U shape. A wide end portion 177c of the third drain electrode 175c overlaps the capacitance electrode 137 to thereby constitute a step-down capacitor Cstd, and a bar-shaped end portion thereof is partially surrounded by the third source electrode 173c.

The first gate electrode 124h, the first source electrode 173h, and the first drain electrode 175h form a first thin film transistor Qh together with the first semiconductor 154h, the second gate electrode 124l, the second source electrode 173l, and the second drain electrode 175l form a second thin film transistor Ql together with the second semiconductor 154l, and the third gate electrode 124c, the third source electrode 173c, and the third drain electrode 175c form a third thin film transistor Qc together with the third semiconductor 154c.

The first semiconductor 154h, the second semiconductor 154l, and the third semiconductor 154c are connected to each other to thereby be provided in a linear shape, and may have a planar shape substantially identical to the data conductors 171, 173h, 173l, 173c, 175h, 175l, and 175c, and ohmic contacts disposed therebelow, in an area excluding a channel area between the source electrodes 173h, 173l, and 173c and the drain electrodes 175h, 175l, and 175c.

The first semiconductor 154h includes an exposed portion that is not covered by the first source electrode 173h and the first drain electrode 175h between the first source electrode 173h and the first drain electrode 175h. The second semiconductor 154l includes an exposed portion that is not covered by the second source electrode 173l and the second drain electrode 175l between the second source electrode 173l and the second drain electrode 175l. The third semiconductor 154c includes an exposed portion that is not covered by the third source electrode 173c and the third drain electrode 175c between the third source electrode 173c and the third drain electrode 175c.

A passivation layer 180 is formed on the data conductors 171, 173h, 173l, 173c, 175h, 175l, and 175c and the semiconductors 154h, 154l, and 154c that are exposed between the source electrodes 173h, 173l, and 173c, and the drain electrodes 175h, 175l, and 175c, respectively. The passivation layer 180 may be made of an organic insulating material or an inorganic insulating material, and may be formed as a single layer or a multilayer.

A color filter 230 is formed within each pixel area PX on the passivation layer 180.

As mentioned above, each pixel area PX may include the first sub-pixel area PXa and the second sub-pixel area PXb. The first sub-pixel area PXa and the second sub-pixel area PXb may be disposed up and down. The first valley V1 is formed between the first sub-pixel area PXa and the second sub-pixel area PXb along a pixel row direction, and the second valley V2 is formed between a plurality of pixel columns.

The color filter 230 is formed on the first sub-pixel area PXa and the second sub-pixel area PXa. Here, the color filter 230 may not be formed on the pixel area PX positioned on one edge of each pixel column.

Each color filter 230 may display one of primary colors such as three primary colors including red, green and blue. The color filter 230 is not limited to three primary colors such as red, green and blue, and may also display cyan, magenta, yellow, white-based color, and the like. Although not illustrated, the color filter 230 may also extend in a column direction between the neighboring data lines 171.

A light blocking member 220 is formed in an area between the neighboring color filters 230. The light blocking member 220 may be formed between the first sub-pixel area PXa and the second sub-pixel area PXb to thereby prevent light leakage. Further, and The light blocking member 220 may be formed on the thin film transistor. The light blocking member 220 vertically extends along the gate line 121 and the step-down gate line 123, and includes a horizontal light blocking member 220a configured to cover an area in which the first thin film transistor Qh, the second thin film transistor Ql, and the third thin film transistor Qc are disposed, and a horizontal light blocking member 220b extending along the data line 17l. That is, the horizontal light blocking member 220a may be formed on the first valley V1, and the horizontal light blocking member 220b may be formed on the second valley V2. The color filter 230 and the light blocking member 220 may overlap each other in some areas.

A first insulating layer 240 may be further formed on the color filter 230 and the light blocking member 220. The first insulating layer 240 may be made of an inorganic insulating material such as silicon nitride (SiNx), silicon oxide (SiOx), and the like. The first insulating layer 240 functions to protect the color filter 230 made of an organic material and the light blocking member 220, and may also be omitted.

A plurality of first contact holes 185h and a plurality of second contact holes 185l configured to respectively expose the wide end portion of the first drain electrode 175h and the wide end portion of the second drain electrode 175l are formed on the first insulating layer 240, the light blocking member 220, and the passivation layer 180.

A pixel electrode 191 is formed on the first insulating layer 240. The pixel electrode 191 may be made of a transparent metal material such as indium-tin oxide (ITO), indium-zinc oxide (IZO), and the like.

The pixel electrode 191 includes a first sub-pixel electrode 191h and a second sub-pixel electrode 191l that are separate from each other based on the gate line 121 and the step-down gate line 123 to thereby be disposed on and below the pixel area PX based on the gate line 121 and the step-down gate line 123 and to neighbor each other in a column direction. That is, the first sub-pixel electrode 191h and the second sub-pixel electrode 191l are separate from each other based on the first valley V1, the first sub-pixel electrode 191h is positioned in the first sub-pixel area PXa, and the second sub-pixel electrode 191l is positioned in the second sub-pixel area PXb.

The first sub-pixel electrode 191h and the second sub-pixel electrode 191l are connected to the first drain electrode 175h and the second drain electrode 175l through the first contact hole 185h and the second contact hole 185l, respectively. Accordingly, when the first thin film transistor Qh and the second thin film transistor Ql are in an on state, data voltage is applied from the first drain electrode 175h and the second drain electrode 175l.

Each of the first sub-pixel electrode 191h and the second sub-pixel electrode 191l is provided in a rectangular shape. Each of the first sub-pixel electrode 191h and the second sub-pixel electrode 191l includes a cross-type stem portion including horizontal stem portions 193h and 193l, and vertical stem portions 192h and 192l configured to intersect the horizontal stem portions 193h and 193l. Also, each of the first sub-pixel electrode 191h and the second sub-pixel electrode 191l includes a plurality of minute branch portions 194h and 194l, and protruding portions 197h and 197l that protrude downward or upward from an edge of a sub-pixel electrode, for example, the first sub-pixel electrode 191h and the second sub-pixel electrode 191l.

The pixel electrode 191 is divided into four sub-areas by the horizontal stem portions 193h and 193l, and the vertical stem portions 192h and 192l. The minute branches 194h and 194l extend obliquely from the horizontal stem portions 193h and 193l and the vertical stem portions 192h and 192l. The extension direction may constitute an angle of about 45 degrees or 135 degrees with the gate line 121 or the horizontal stem portions 193h and 193l. Also, directions in which the minute branch portions 194h and 194l of two neighboring sub-areas extend may be orthogonal to each other.

In the present exemplary embodiment, the first sub-pixel electrode 191h further includes an outer stem portion 197h configured to surround the minute branch portions 192h, 193h, and 194h. The second sub-pixel electrode 191l further includes horizontally-extending portions that are disposed at an upper end and a lower end of the second sub-pixel electrode 191l, and left and right vertical portions 198 that are positioned on the left and the right of the first sub-pixel electrode 191h. The left and right horizontal portions 198 may prevent capacitive combination, that is, coupling between the data line 171 and the first sub-pixel electrode 191h.

The aforementioned structure of the thin film transistor and shape of the pixel electrode are provided as an example and thus, the present invention is not limited thereto and various modifications may be made.

A common electrode 270 is formed on the pixel electrode 191 to be separate from the pixel electrode 191 by a predetermined distance. The micro-cavity 305 is formed between the pixel electrode 191 and the common electrode 270. That is, the micro-cavity 305 is enclosed, at least in part, by the pixel electrode 191 and the common electrode 270. The dimensions and size of the micro-cavity 305 may be modified according to a resolution of a display device. In some embodiments, the common electrode 270 may be formed on an insulating layer disposed between the pixel electrode 191 and the common electrode 270. In such embodiments, the micro-cavity 305 is not formed between the pixel electrode 191 and the common electrode 270, as the micro-cavity 305 would be formed on the common electrode 270.

The common electrode 270 may be made of a transparent metal material such as indium-tin oxide (ITO), indium-zinc oxide (IZO), and the like. Constant voltage may be applied to the common electrode 270, and an electric field may be formed between the pixel electrode 191 and the common electrode 270.

A liquid crystal layer including liquid crystal molecules 310 is formed in the micro-cavity 305 disposed between the pixel electrode 191 and the common electrode 270. The liquid crystal molecules 310 have a negative dielectric anisotropy, and may stand in a direction vertical to the substrate 110 in the absence of electric field. That is, a vertical alignment may be performed.

A first alignment layer 11 is formed on the pixel electrode 191. The first alignment layer 11 may be formed even on the first insulating layer 240 that is not covered by the pixel electrode 191.

A second alignment layer 21 is formed below the common electrode 270 to face the first alignment layer 11.

The first alignment layer 11 and the second alignment layer 21 may include a vertical alignment layer, and may be made of a material such as polyamic acid, polysiloxane, polyimide, and the like. The first and the second alignment layers 11 and 21 may be connected to each other at the edge of the pixel area PX.

The first sub-pixel electrode 191h and the second sub-pixel electrode 191l to which the data voltage is applied generate an electric field together with the common electrode 270 to thereby determine a direction of liquid crystal molecule 310 positioned within the micro-cavity 305. Luminance of light passing through the liquid crystal layer varies based on the direction of liquid crystal molecules 310 determined as above.

A second insulating layer 350 may be further formed on the common electrode 270. The second insulating layer 350 may be made of an inorganic insulating material such as silicon nitride (SiNx), silicon oxide (SiOx), and the like, and may also be omitted in some cases.

The roof layer 360 is formed on the second insulating layer 350. The roof layer 360 may be made of an organic material. The micro-cavity 305 may be formed below the roof layer 360, and a shape of the micro-cavity 305 may be maintained by the roof layer 360. The roof layer 360 is formed to be separated from the pixel electrode 191 at least by the micro-cavity 305 disposed between the pixel electrode 191 and the roof layer 360.

As described above, the roof layer 360 includes the upper portion 362 configured to cover the top surface of the micro-cavity 305 and the sidewall portion 364 configured to cover the side surface of the micro-cavity 305. The upper portion 362 of the roof layer 360 is formed on the pixel area PX, and the sidewall portion 364 is formed on the second valley V2.

The first injection hole 307 is formed on the roof layer 360 to expose at least a portion of the first edge and the second edge of the micro-cavity 305. The second injection holes 308 and 309 are formed on the roof layer 360 to expose at least a portion of the space between neighboring micro-cavities 305.

The second injection hole 308 positioned next to the left edge of the micro-cavity 305 differs from the second injection hole 309 positioned next the right edge of the micro-cavity 305 in terms of at least one of shape, size, and number.

The first injection hole 307 and the second injection hole 308, 309 extend through the roof layer 360 to the micro-cavity 305. Thus, the first and second injection holes 307, 308, 309 allow material, such as an aligning agent and/or a liquid crystal material to be injected into the micro-cavity 305 through the first injection hole 307 or the second injection hole 308, 309. As is well known, an aligning agent for liquid crystal molecules often includes solids suspended in a liquid medium. During a drying process of the aligning agent, solids may be concentrated in one portion instead of being uniformly distributed, undesirably causing an aggregation phenomenon of the alignment layer.

In a display device according to an exemplary embodiment of the present invention, the second injection hole 308 positioned next to the left edge of the micro-cavity 305 differs from the second injection hole 309 positioned next to the right edge of the micro-cavity 305 in terms of at least one of shape, size, and number. Accordingly, capillary forces acting in the second injection holes 308 differ from the capillary forces experienced by the second injection holes 309. For example, where the second injection hole 309 is smaller than the second injection hole 309, a stronger capillary force will be experienced by in the second injection hole 309. Accordingly, aggregation of solids in the alignment layer occurs around the second injection hole 309 positioned next to the right edge of the micro-cavity 305. That is, by making the second injection holes 308 and 309 asymmetric, with respect to the micro-cavity 305, it is possible to control the aggregation position of the alignment layer.

A third insulating layer 370 may be further formed on the roof layer 360. The third insulating layer 370 may be made of an inorganic insulating material such as silicon nitride (SiNx), silicon oxide (SiOx), and the like. The third insulating layer 370 may be formed to cover the top surface and the side surface of the roof layer 360. The third insulating layer 370 serves to protect the roof layer 360 made of an organic material, and may be omitted depending on a necessity.

An encapsulation layer 390 may be formed on the third insulating layer 370. The encapsulation layer 390 is formed so as to cover the first injection hole 307 and the second injection hole 309 to externally expose a portion of the micro-cavity 305. That is, the encapsulation layer 390 may seal the micro-cavity 305 to prevent the liquid crystal molecules 310 formed within the micro-cavity 305 from leaking out. The encapsulation layer 390 contacts the liquid crystal molecules 310 and thus, may be made of a material that does not react with the liquid crystal molecules 310. For example, the encapsulation layer 390 may be made of parylene.

The encapsulation layer 390 may include a multilayer structure such as a double-layer and a triple-layer structure. A double-layer structure includes two layers that are made of different materials. A triple-layer structure includes three layers where materials in adjacent layers differ from each other. For example, the encapsulation layer 390 may include a layer made of an organic insulating material and a layer made of an inorganic insulating material.

Although not illustrated, at least one polarizer may be formed on upper and/or lower surfaces of the display device. The polarizer may include a first polarizer and a second polarizer. The first polarizer may be attached on the lower surface of the substrate 110, and the second polarizer may be attached on the encapsulation layer 390.

Hereinafter, a display device according to an exemplary embodiment of the present invention will be described with reference to FIG. 8.

Figure 8:
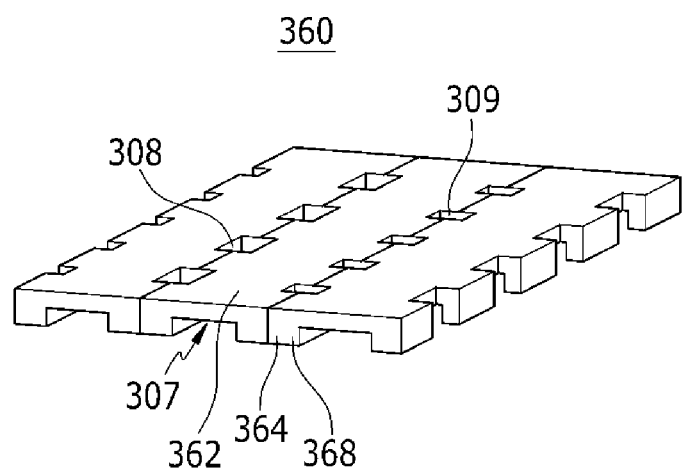
FIG. 8 is a perspective view illustrating a roof layer of a display device according to an exemplary embodiment of the present invention.

The display device according to an exemplary embodiment of the present invention, illustrated in FIG. 8, is significantly similar to the display device according to an exemplary embodiment illustrated in FIG. 7. Accordingly, hereinafter, any redundant description will be omitted and differences between embodiments will be highlighted. A difference between the embodiments of FIG. 7 and FIG. 8 lies in that a support pillar is added to reduce an area of a first injection hole, and will be further described in detail below.

FIG. 8 is a perspective view illustrating a roof layer of a display device according to an exemplary embodiment of the present invention.

Referring to FIG. 8, in the display device according to an exemplary embodiment of the present invention, a thin film transistor and the pixel electrode 191 connected thereto are formed on the substrate 110. The roof layer 360 is formed on the pixel electrode 191 to be separate therefrom based on the micro-cavity 305 disposed between the roof layer 360 and the pixel electrode 191. The first injection hole 307 configured to expose at least a portion of the first edge and the second edge of the micro-cavity 305 and the second injection holes 308 and 309 configured to expose at least a portion of the left edge and the right edge of the micro-cavity 305 are formed on the roof layer 360. The liquid crystal layer including the liquid crystal molecules 310 is formed within the micro-cavity 305, and the encapsulation layer 390 is formed on the roof layer 360 to seal the micro-cavity 305.

The display device according to an exemplary embodiment of the present invention further includes a support pillar 368 extending from the roof layer 360 to cover at least a portion of the first edge or the second edge of the micro-cavity 305. The support pillar 368 extends from the upper portion 362 and the sidewall portion 364 of the roof layer 360, and is made of the same material. By forming the support pillar 368, it is possible to reduce an area of the first injection hole 307. Accordingly, it is possible to increase a capillary force acting in the first injection hole 307.

Here, by forming the support pillar 368 on only one of the first edge and the second edge of the micro-cavity 305, it is possible to induce different capillary forces to act in the first injection holes 307 positioned on the first edge from capillary forces at the second edge of the micro-cavity 305.

Hereinafter, a display device according to an exemplary embodiment of the present invention will be described with reference to FIGS. 9 through 11.

Figure 9:
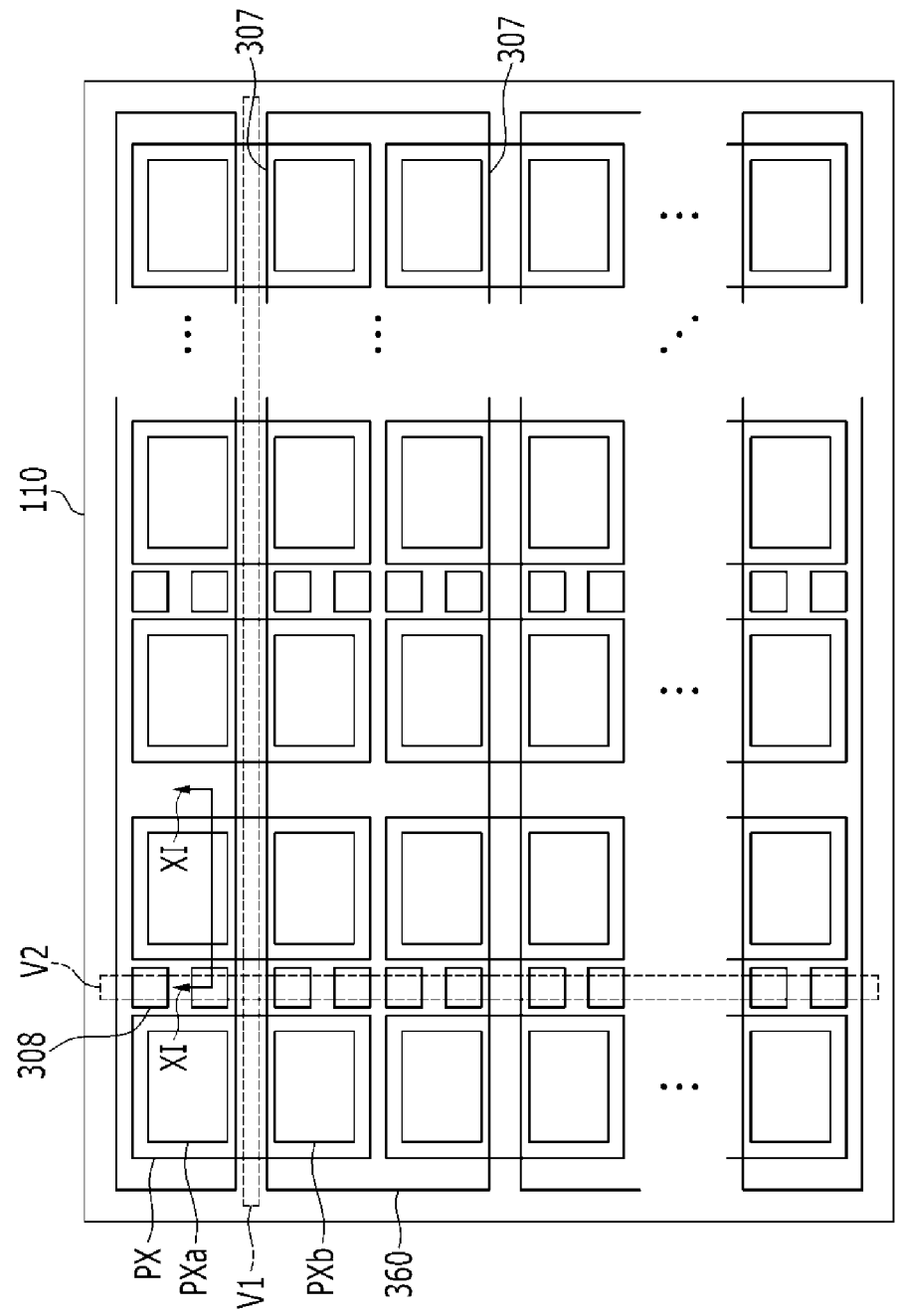
FIG. 9 is a top plan view illustrating a display device according to an exemplary embodiment of the present invention.
Figure 10:
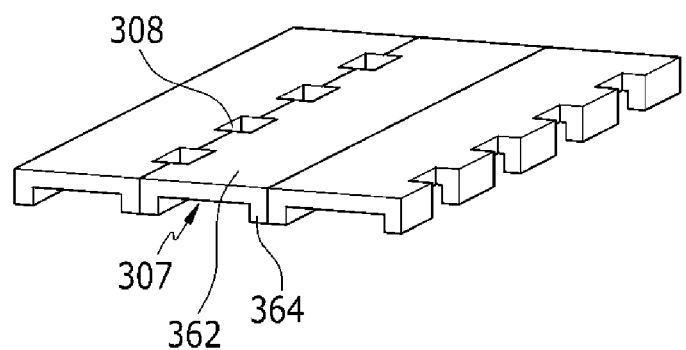
FIG. 10 is a perspective view illustrating a roof layer of a display device according to an exemplary embodiment of the present invention.
Figure 11:
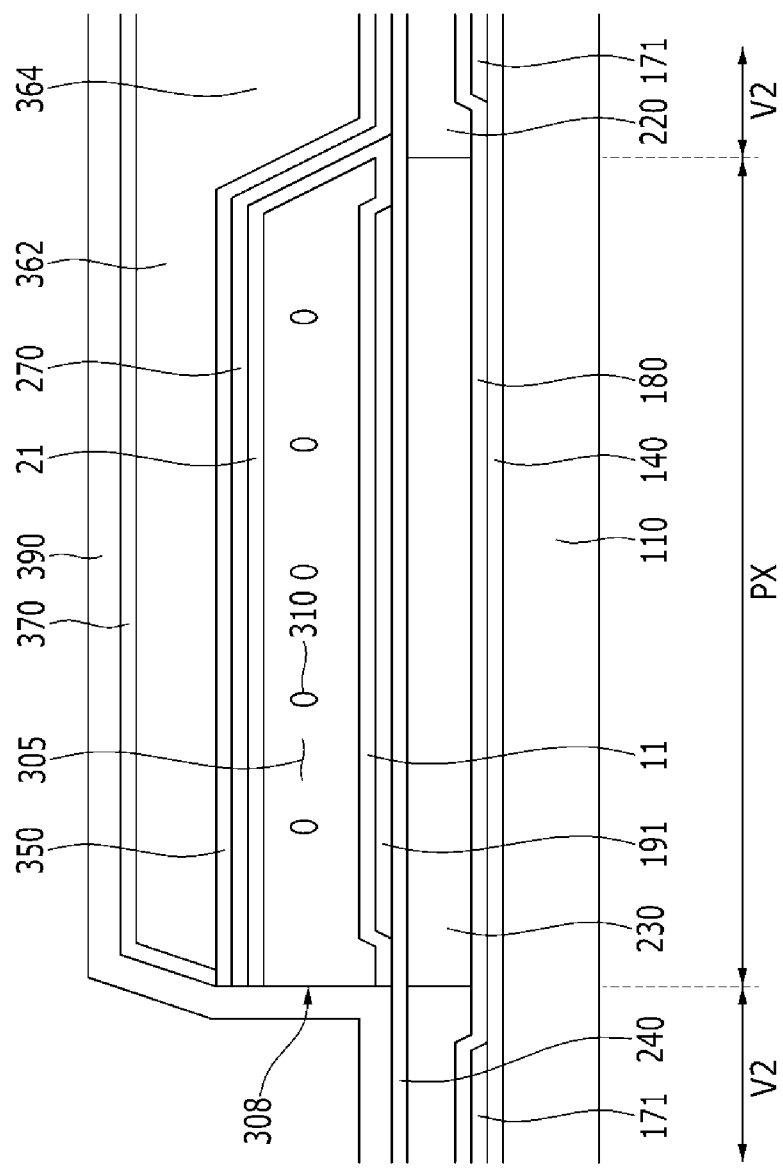
FIG. 11 is a cross-sectional view illustrating a portion of a display device according to an exemplary embodiment of the present invention taken along line XI-XI of FIG. 9.

The display device according to an exemplary embodiment of the present invention, illustrated in FIGS. 9 through 11, is significantly similar to the display device according to an exemplary embodiment of the present invention, illustrated in FIGS. 1 through 7. Accordingly, any redundant description will be omitted and differences between embodiments will be highlighted. A difference with the aforementioned exemplary embodiments lies in that a second injection hole is formed only next to one edge of a micro-cavity, as will be described below.

FIG. 9 is a top plan view illustrating a display device according to an exemplary embodiment of the present invention, FIG. 10 is a perspective view illustrating a roof layer of a display device according to an exemplary embodiment of the present invention, and FIG. 11 is a cross-sectional view illustrating a portion of a display device according to an exemplary embodiment of the present invention taken along line XI-XI of FIG. 9.

Although the second injection holes positioned near the left edge and the right edge of the micro-cavity are asymmetrically formed in the aforementioned exemplary embodiments, the second injection hole 308 is formed near just one of the left edge and the right edge of the micro-cavity 305 in the present exemplary embodiment. For example, the second injection hole 308 is formed only next to the left edge of the micro-cavity 305, and no injection hole is formed next to the right edge of the micro-cavity 305.

In the present exemplary embodiment, by forming the second injection hole 308 on only one side of the micro-cavity 305, an aggregation phenomenon of the alignment layer occurs on that of the micro-cavity 305 (on the side next to which the second injection hole 308 is formed). That is, by forming the second injection hole 308 on only one edge of the left edge and the right edge of the micro-cavity 305, it is possible to control an aggregation position of the alignment layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 11: first alignment layer | 21: second alignment layer |
| 110: substrate | 121: gate line |
| 123: step-down gate line | 124h: the first gate electrode |
| 124l: second gate electrode | 124c: third gate electrode |
| 131: storage electrode line | 140: gate insulating layer |
| 154h: first semiconductor | 154l: second semiconductor |
| 154c: third semiconductor | 171: data line |
| 173h: first source electrode | 173l: second source electrode |
| 173c: third source electrode | 175a: first drain electrode |
| 175l: second drain electrode | 175c: third drain electrode |
| 180: passivation layer | 191: pixel electrode |
| 191h: first sub-pixel electrode | 191l: second sub-pixel electrode |
| 220: light blocking member | 230: color filter |
| 240: first insulating layer | 270: common electrode |
| 300: sacrificial layer | 305: micro-cavity |
| 307: first injection hole | 308, 309: second injection hole |
| 310: liquid crystal molecule | 350: second insulating layer |
| 360: roof layer | 362: upper portion of roof layer |
| 364: sidewall portion of roof layer | 370: third insulating layer |
| 390: encapsulation layer | |

What is claimed is:

1. A display device comprising:
a substrate including a plurality of pixel areas;
a thin film transistor disposed on the substrate;
a pixel electrode connected to the thin film transistor and disposed on the pixel area;
a roof layer disposed above the pixel electrode and separated from the pixel electrode by a micro-cavity disposed between the pixel electrode and the roof layer;
a first injection hole disposed on a first surface of the roof layer and extending to at least a portion of a first edge or a second edge of the micro-cavity, the first edge being opposite to the second edge;
a second injection hole disposed on a second surface of the roof layer and extending to at least a portion of a left edge or a right edge of the micro-cavity, the left edge being opposite to the right edge, the left edge connecting one ends of the first edge and the second edge, and the right edge connecting the other ends of the first edge and the second edge;

a liquid crystal layer in the micro-cavity; and an encapsulation layer disposed on the roof layer covering the first injection hole and the second injection hole and sealing the micro-cavity.

2. The display device of claim 1, wherein the second injection hole positioned at the left edge of the micro-cavity differs from the second injection hole positioned at the right edge of the micro-cavity in terms of at least one of shape, size, and number.

3. The display device of claim 2, wherein the micro-cavity is one of a plurality of micro-cavities disposed in a matrix configuration including a plurality of rows and a plurality of columns, the display device further comprising:

a first valley disposed between the micro-cavities positioned in different rows; and a second valley disposed between the micro-cavities positioned in different columns.

4. The display device of claim 3, wherein the first injection hole is disposed on the first valley, and the second injection hole is disposed on the second valley.

5. The display device of claim 3, wherein the roof layer comprises:

an upper portion configured to cover the micro-cavity; and a sidewall portion configured to cover a left or right edge of the micro-cavity.

6. The display device of claim 5, wherein the upper portion is disposed on the pixel area, and the sidewall portion is disposed on the second valley.

7. The display device of claim 1, further comprising:

a support pillar extending from the roof layer to cover at least a portion of the first edge or the second edge of the micro-cavity.

8. The display device of claim 7, wherein the support pillar reduces the size of the first injection hole.

9. The display device of claim 5, wherein the second injection hole is disposed to be positioned on at least one second valley next to the micro-cavity.

10. A roof layer for holding liquid crystal molecules in a display device, the roof layer covering a plurality of micro-cavities for holding the liquid crystal molecules, wherein the roof layer has a sidewall portion and an upper portion that is substantially perpendicular to the sidewall portion, wherein the side wall portion and the upper portion have a first injection hole and a second injection hole extending to the micro-cavities, respectively.

11. The roof layer of claim 10, wherein the second injection hole is one of a plurality of second injection holes that are disposed asymmetrically with respect to at least one of the micro-cavities.

12. The roof layer of claim 10, wherein the second injection hole extends to a plurality of micro-cavities.

* * * * *